(12) United States Patent
Chang

(10) Patent No.: US 6,640,357 B1
(45) Date of Patent: Nov. 4, 2003

(54) BACK-TO-BACK FAUCET VALVE STRUCTURES

(75) Inventor: Chia-Bo Chang, Changhua Hsien (TW)

(73) Assignee: Hain Yo Enterprises Co., Ltd., Changhua Hsien (TW)

( * ) Notice: Subject to any disclaimer, the term of this patent is extended or adjusted under 35 U.S.C. 154(b) by 0 days.

(21) Appl. No.: 10/326,927

(22) Filed: Dec. 22, 2002

(51) Int. Cl.⁷ .................................................. E03C 1/04
(52) U.S. Cl. .................... 4/675; 4/676; 4/677; 137/360; 137/607; 137/625.41; 137/625.21; 137/637.3; 137/801
(58) Field of Search ....................... 4/675–678; 134/360, 134/607, 625.21, 625.41, 625.46, 637.3, 801

(56) References Cited

U.S. PATENT DOCUMENTS 5,368,071 A * 11/1994 Hsieh .......................... 137/801
5,806,552 A * 9/1998 Martin, Jr. ............. 137/625.41

* cited by examiner

Primary Examiner—Tuan N. Nguyen
(74) Attorney, Agent, or Firm—Harrison & Egbert

(57) ABSTRACT

A water faucet structure includes a first valve seat mounted in one side of a wall, a first ceramic control valve fastened to the first valve seat, a second valve seat mounted in other side of the wall in a back-to-back manner in relation to the first valve seat, and a second ceramic control valve fastened to the second valve seat. The first and the second ceramic control valves each have a bottom seat which is provided with a cold water inlet, a hot water inlet, and a water outlet. The water inlets and the water outlets of the first and the second ceramic control valves are arranged in a mirror image pattern.

1 Claim, 7 Drawing Sheets

US 6,640,357 B1

BACK-TO-BACK FAUCET VALVE STRUCTURES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a device for regulating the flow of water from a pipe, and more particularly to two faucet valve structures which are arranged in a back-to-back manner.

BACKGROUND OF THE INVENTION

As shown in FIGS. 7 and 8, two faucet valve structures of the prior art are mounted in a back-to-back fashion such that one faucet valve structure is disposed in one side 41 of a wall, and that other faucet valve structure is disposed in an opposite side 42 of the wall. The one faucet valve structure comprises a valve seat 30, a ceramic valve 33, and a valve knob 40, while the other faucet valve structure comprises a valve seat 301, a ceramic valve 33, and a valve knob 40. The valve seats 30 and 301 are provided with a water discharging hole 34. The water discharging hole 34, a cold water inlet 35, and a hot water inlet 36 are arranged in a triangular manner so as to be cooperative with a water discharging hole 37, a cold water inlet 38 and a hot water inlet 39 of the ceramic valve 33, as illustrated in FIG. 8.

As the valve knob 40 is turned clockwise, the cold water is let out first before it is mixed with the hot water so as to avert the incident of hot-water burn. In light of the prior art layout as shown in FIG. 7, the cold water is let out first prior to the hot water by the valve seat 30 and the ceramic valve 33, which are mounted in the one side 41 of the wall. However, in the case of the valve seat 301 and the ceramic valve 33, which are mounted in the other side 42 of the wall, the hot water is let out first ahead of the cold water. Such a disparity between two sides 41 and 42 of the wall is resulted from the faulty design of the prior art structure.

BRIEF SUMMARY OF THE INVENTION

The primary objective of the present invention is to provide a water faucet structure free of the deficiency of the prior art structure described above.

In keeping with the principle of the present invention, the foregoing objective of the present invention is attained by a faucet structure comprising a first valve seat, a first ceramic control valve fastened with the first valve seat which is mounted in one side of a wall, a second valve seat and a second ceramic control valve fastened with the second valve seat which is mounted in another side of the wall in a back-to-back manner in relation to the first valve seat. The first ceramic control valve and the second ceramic control valve have a bottom seat which is provided with a cold water inlet, a hot water inlet, and a water outlet. The inlets and the outlets of the first and the second ceramic control valves are arranged in a mirror image pattern, thereby resulting in agreement between the first ceramic control valve and the second ceramic control valve in terms of the discharge order of the cold water and the hot water.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
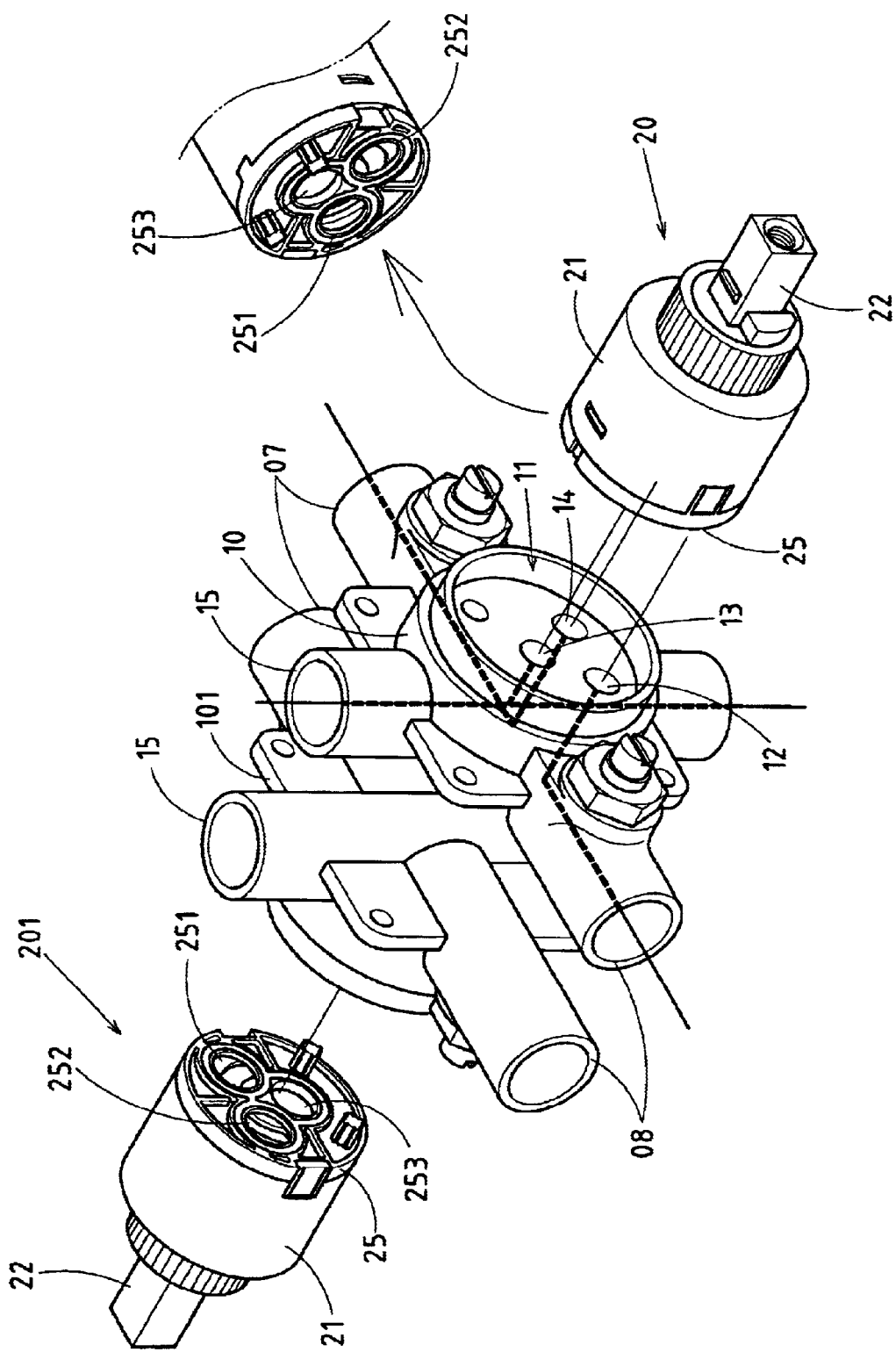
FIG. 1 shows an exploded perspective view of the preferred embodiment of the present invention.
Figure 2:
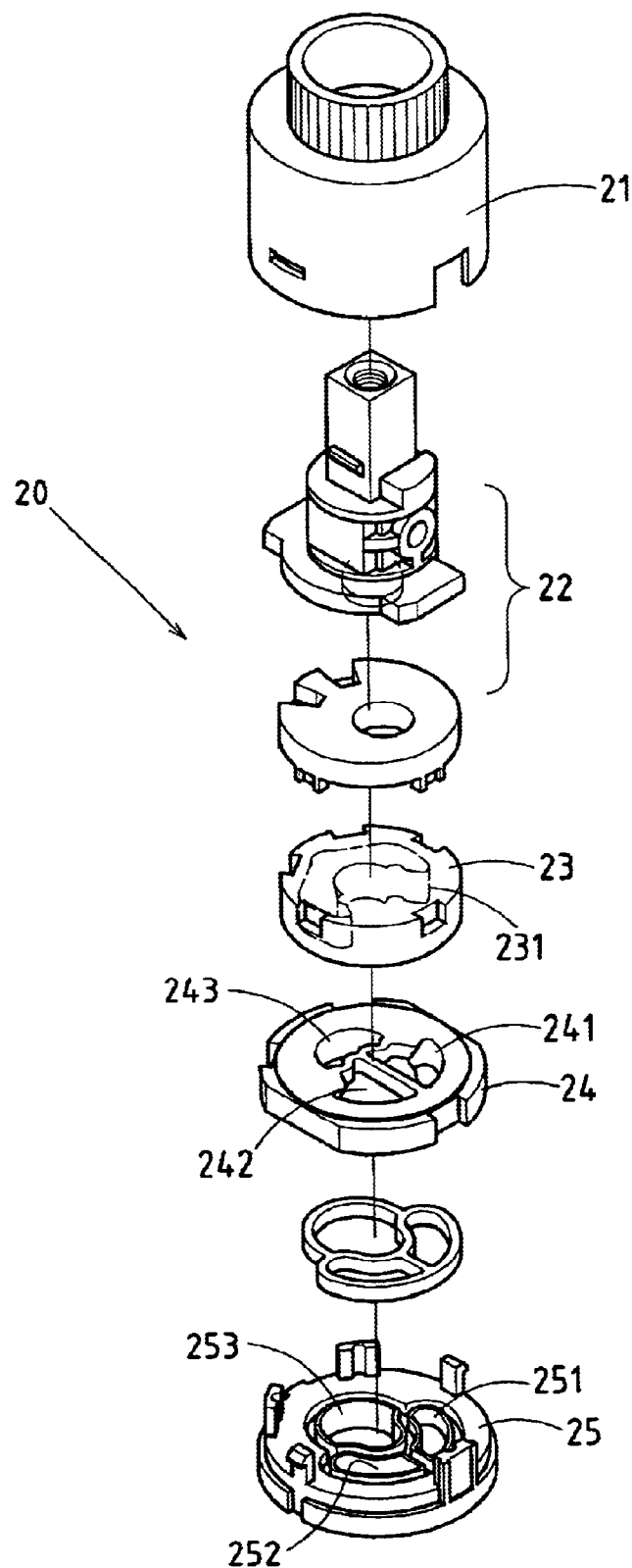
FIG. 2 shows an exploded perspective view of the ceramic control valve of the present invention.

As shown in FIGS. 1–6, a faucet structure embodied in the present invention comprises a first valve seat 10, a first ceramic control valve 20, a second valve seat 101, and a second ceramic control valve 201. The first valve seat 10 and the first ceramic control valve 20 are mounted in one side "A" of a wall 05, while the second valve seat 101 and the second ceramic control valve 201 are mounted in a back-to-back manner in the other side "B" of the wall 05. The first valve seat 10 and the second valve seat 101 are commonly connected to a cold water pipe 07 and a hot water pipe 08.

The first valve seat 10 and the second valve seat 101 are provided with a fastening slot 11 which is in turn provided with a cold water inlet 12, a hot water inlet 13, and a water outlet 14. The inlets 121, 13, and the outlet 13 are arranged in a triangular pattern. The outlet 14 is connected with a longitudinal pipe 15 which is in turn fastened at another end thereof with a shower head or faucet.

The first ceramic control valve 20 and the second ceramic control valve 201 are formed of a housing 21 in which a rotary control member 22, a water control block 23, a water distribution seat 24, and a bottom seat 25 are disposed. The water control block 23 is provided with a water slot 231. The water distribution seat 24 is provided with a cold water inlet 241, a hot water inlet 242, and a water outlet 243. The bottom seat 25 is located at the bottom of the housing 21 and is provided with a cold water inlet 251 corresponding in location to the cold water inlet 241 of the water distribution seat 24, a hot water inlet 252 corresponding in location to the hot water inlet 241 of the water distribution seat 24, and a water outlet 253 corresponding in location to the water outlet 243 of the water distribution seat 24. The water control block 23 is actuated by the rotary control member 22 to regulate the flow of the cold water and the hot water.

Figure 3:
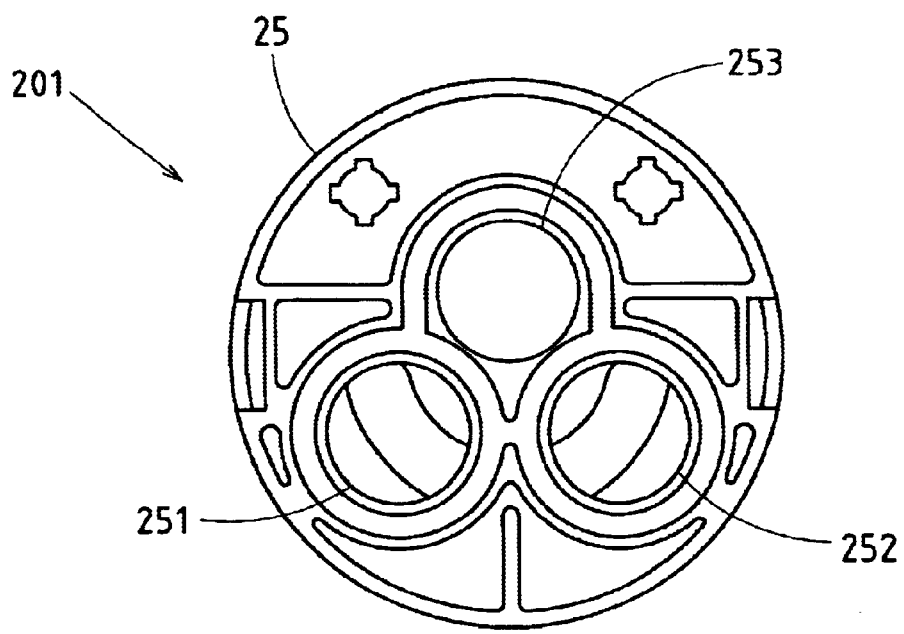
FIG. 3 shows a schematic plan view of the front valve seat of the present invention.
Figure 4:
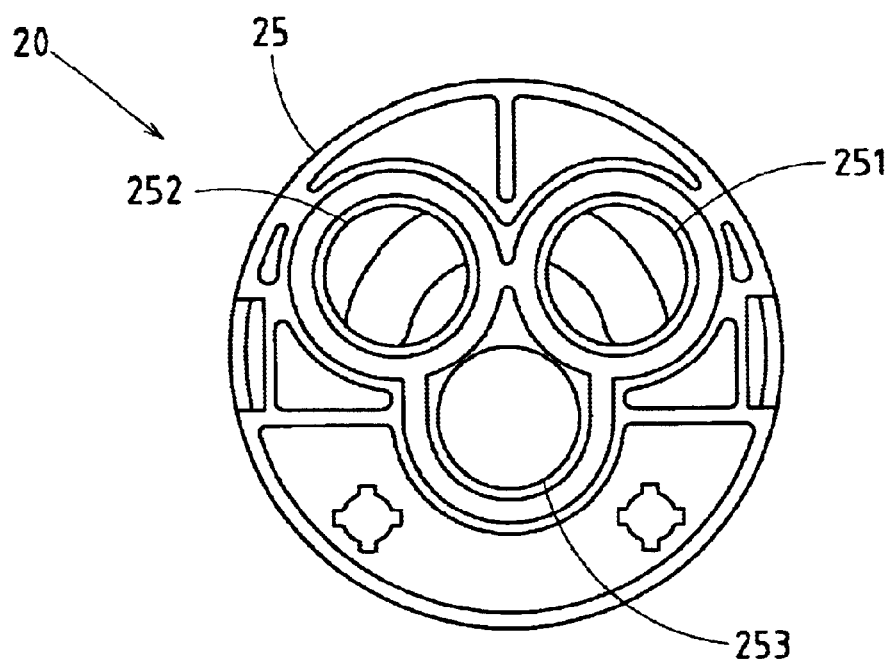
FIG. 4 shows a schematic plan view of the rear valve seat of the present invention.

As shown in FIGS. 3 and 4, the cold water inlet 251, the hot water inlet 252, and the water outlet 253 of the first ceramic control valve 20 are arranged in a mirror image pattern in relation to the cold water inlet 251, the hot water inlet 252, and the water outlet 253 of the second ceramic control valve 201.

Figure 5:
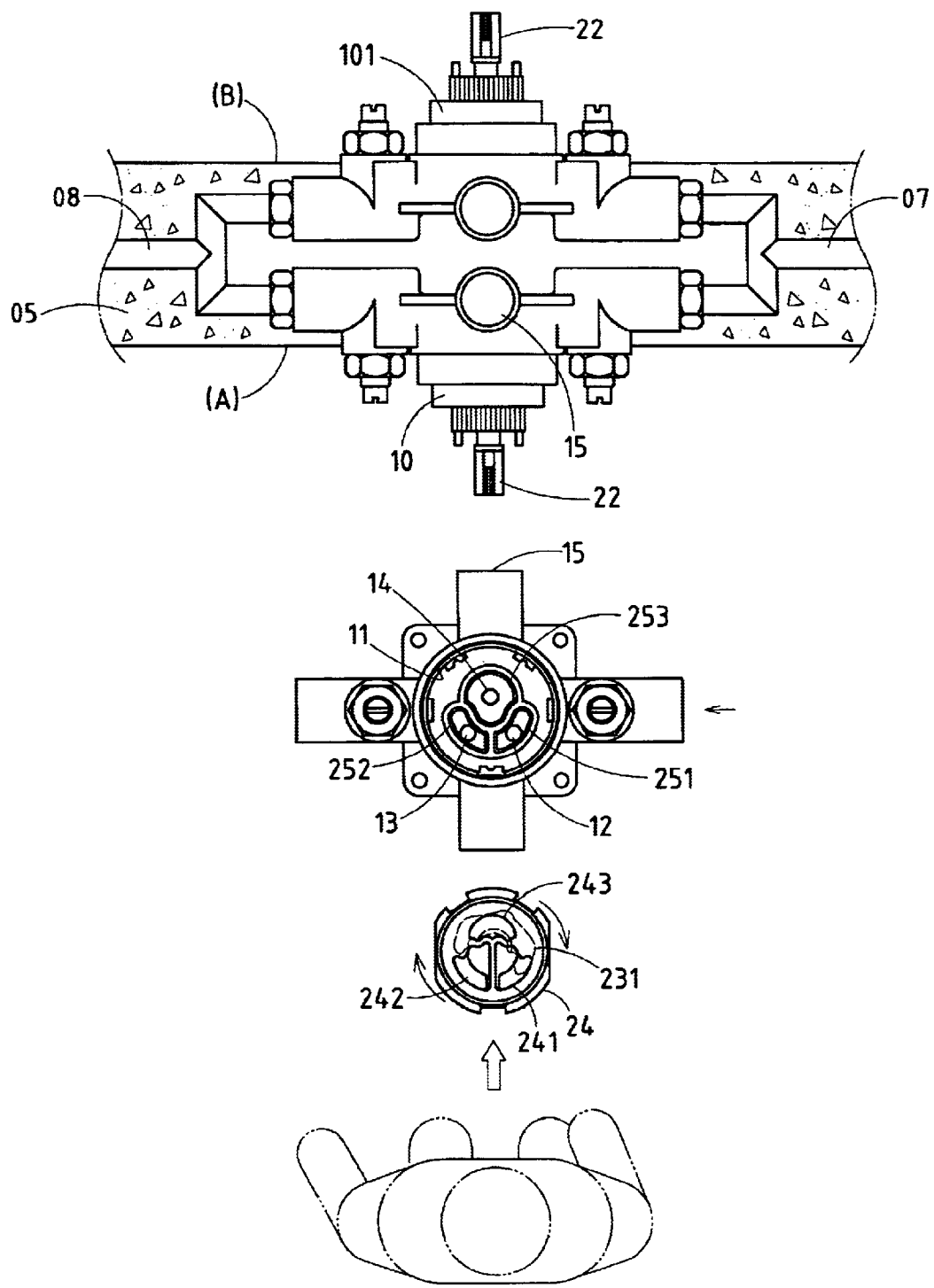
FIG. 5 shows a schematic view of assembly of the front valve seat and the front ceramic control valve of the present invention.

As shown in FIG. 5, the first ceramic control valve 20 is fastened to the first valve seat 10 such that the cold water inlet 251 and the hot water inlet 252 of the bottom seat 25 of the first ceramic control valve 20 are aligned respectively with the cold water inlet 12 and the hot water inlet 13 of the fastening slot 11 of the first valve seat 10. Meanwhile, the water outlet 253 of the bottom seat 25 is aligned with the water outlet 14 of the fastening slot 11 of the first valve seat 10. As the water control block 23 of the first ceramic control valve 20 is actuated by the rotary control member 22, the water slot 231 of the water control block 23 is first aligned with the cold water inlet 241 of the water distribution seat 24, thereby resulting in the cold water being let out first.

Figure 6:
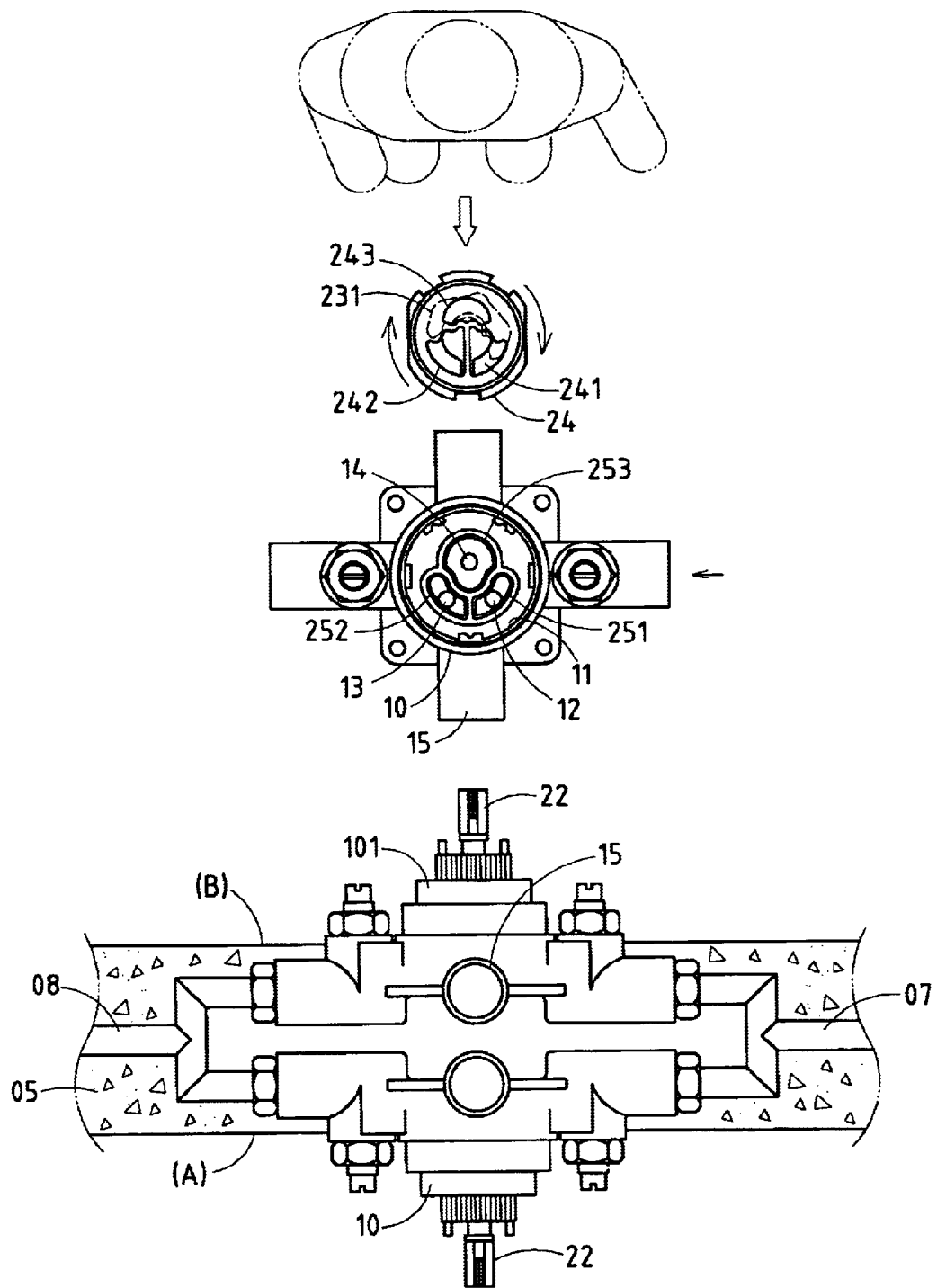
FIG. 6 shows a schematic view of assembly of the rear valve seat and the rear ceramic control valve of the present invention.
Figure 7:
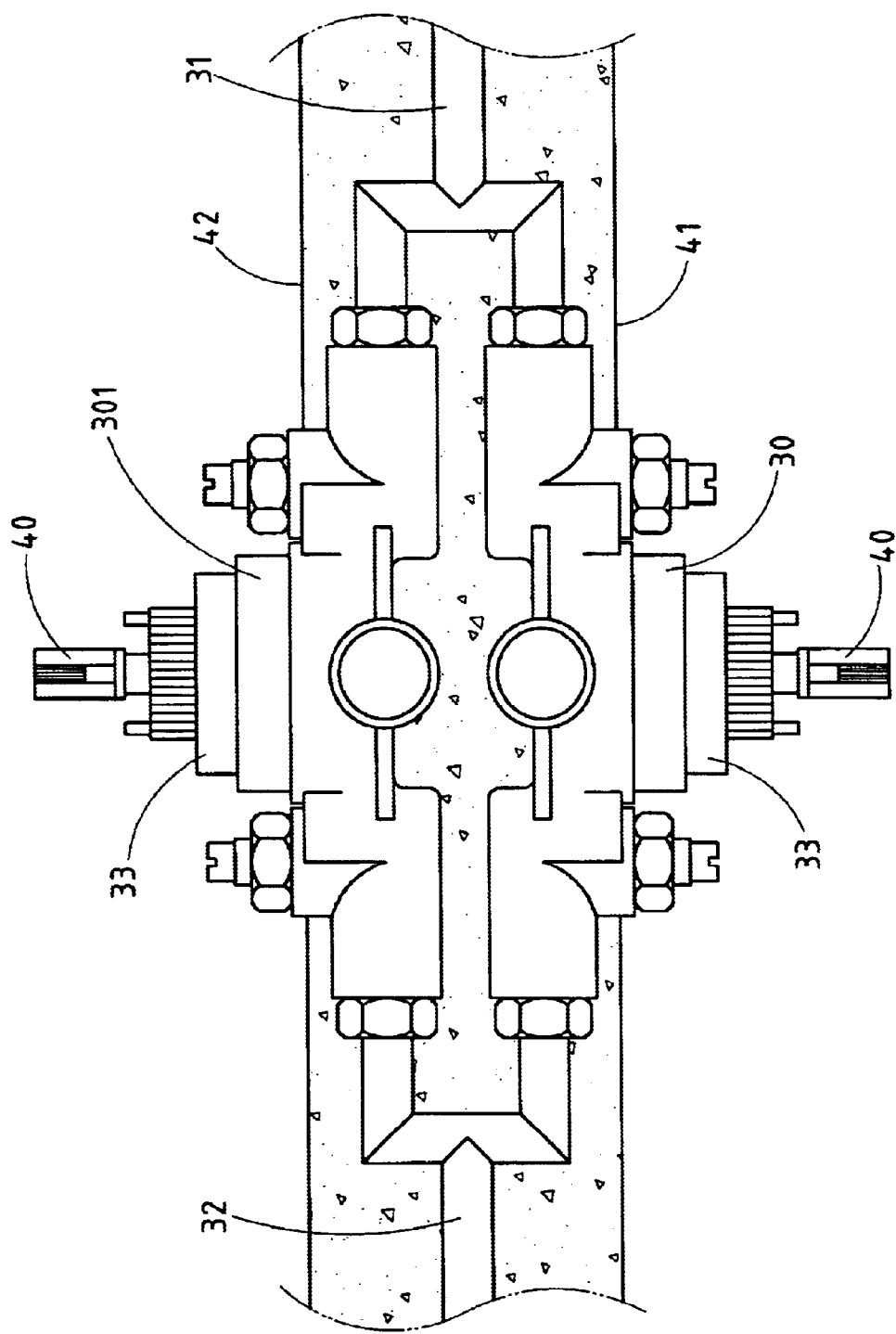
FIG. 7 shows a sectional schematic view of a water faucet structure of the prior art.
Figure 8:
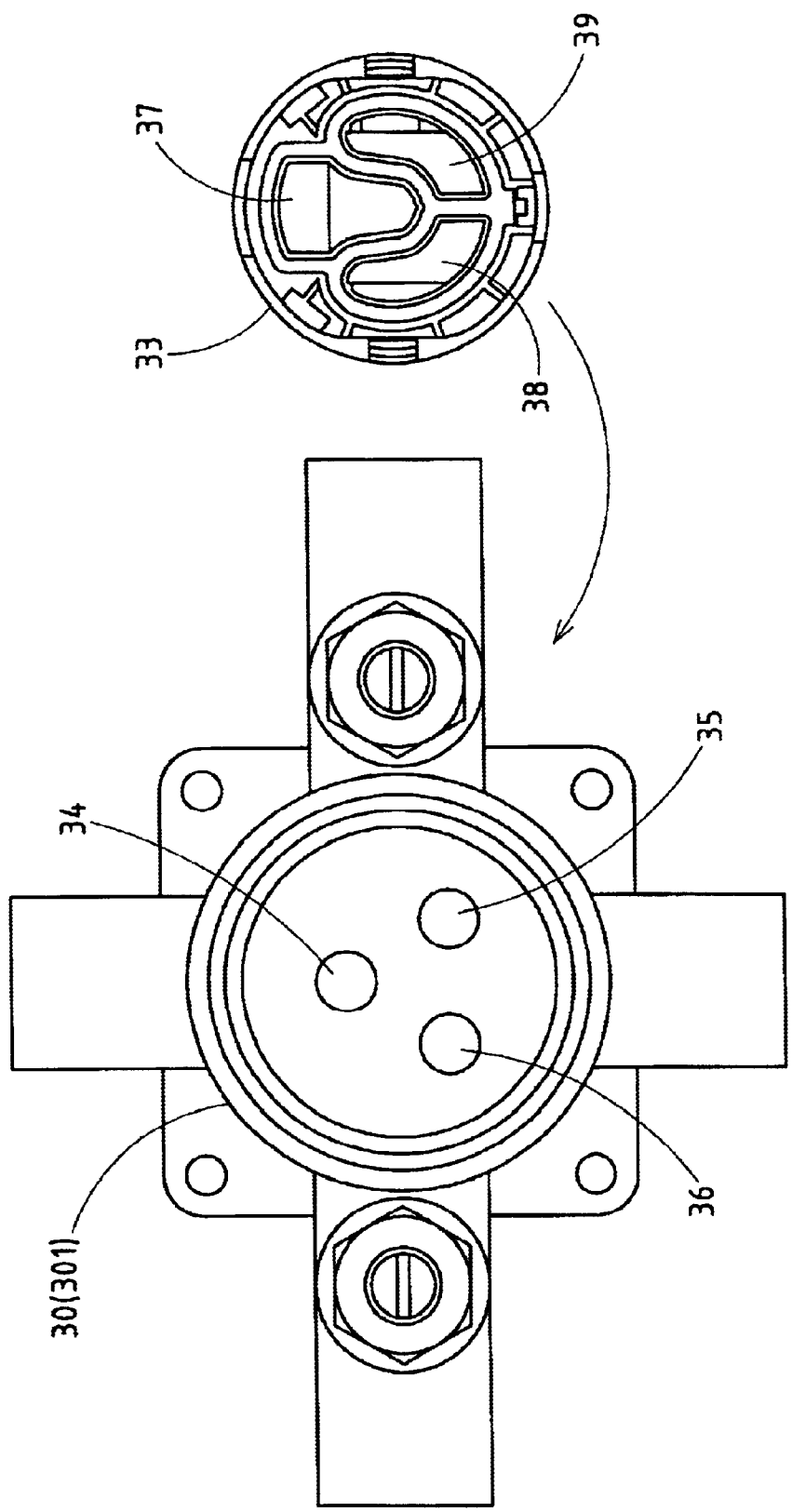
FIG. 8 shows a schematic plan view of the valve seat and the ceramic valve of the prior art structure as shown in FIG. 7.

As shown in FIG. 6, the second ceramic control valve 201 is fastened with the second valve seat 101. In light of the mirror image arrangement of the water inlets and the water outlets, the cold water inlet 251 and the hot water inlet 252 of the bottom seat 25 are aligned respectively with the cold water inlet 12 and the hot water inlet 13 of the fastening slot 11 of the second valve seat 101. The water outlet 253 of the bottom seat 25 is aligned with the water outlet 14 of the fastening slot 11 of the second valve seat 101. The water distribution seat 24 and the water control block 23 of the second ceramic control valve 201 must be rearranged. The water inlets 12 and 13 and the water outlet 14 of the fastening slot 11 of the second valve seat 101 must be rearranged accordingly. As the water control block 23 of the second ceramic control valve 201 is actuated by the rotary control member 22 to turn clockwise, the water slot 231 of the water control block 23 is first aligned with the cold water inlet 241 of the water distribution seat 24, thereby allowing the cold water to let out first.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A water faucet structure comprising:

a first valve seat mounted in one side of a wall and comprised of a fastening slot whereby said fastening slot is comprised of a cold water inlet, a hot water inlet, and a water outlet, which are arranged in a triangular pattern, with said water outlet being connected to one end of a longitudinal pipe which is fastened at another end to a shower head or faucet;

a second valve seat mounted in other side of the wall such that said second valve seat and said first valve seat are arranged in a back-to-back manner, said second valve seat comprised of a fastening slot whereby said fastening slot is comprised of a cold water inlet, a hot water inlet, and a water outlet, which are arranged in a triangular pattern, with said water outlet being connected to one end of a longitudinal pipe which is fastened at another end to a shower head or faucet; and a first ceramic control valve and a second ceramic control valve, each control valve being comprised of a housing, a rotary control member, a water control block, a water distribution seat, and a bottom seat, with said water control block being comprised of a water slot, with said water distribution seat being comprised of a cold water inlet, a hot water inlet, and a water outlet, and with said bottom seat being comprised of a cold water inlet corresponding in location to said cold water inlet of said water distribution seat, a hot water inlet corresponding in location to said hot water inlet of said water distribution seat, and a water outlet corresponding in location to said water outlet of said water distribution seat, said first ceramic control valve being fastened to said first valve seat, said second ceramic control valve being fastened to said second valve seat;

wherein said cold water inlet, said hot water inlet, and said water outlet of said bottom seat of said first ceramic control valve are arranged in a mirror image pattern in relation to said cold water inlet, said hot water inlet, and said water outlet of said bottom seat of said second ceramic control valve.

* * * * *